(12) United States Patent
Ruggieri

(10) Patent No.: US 7,853,346 B2
(45) Date of Patent: Dec. 14, 2010

(54) METHOD OF REAL-TIME SCHEDULING OF PROCESSES AT DISTRIBUTED MANUFACTURING SITES

(75) Inventor: Vito Massimo Ruggieri, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 12/214,917

(22) Filed: Jun. 24, 2008

(65) Prior Publication Data

US 2009/0012641 A1 Jan. 8, 2009

(30) Foreign Application Priority Data

Jun. 29, 2007 (EP) ................... 07012779

(51) Int. Cl.
*G06F 19/00* (2006.01)
(52) U.S. Cl. .................. 700/99; 700/100; 700/108
(58) Field of Classification Search ............... 700/99, 700/100, 106–108, 95, 97; 705/7–9, 22, 705/28, 29
See application file for complete search history.

(56) References Cited

U.S. PATENT DOCUMENTS

| | | | |
|---|---|---|---|
| 6,088,626 A * | 7/2000 | Lilly et al. ............... | 700/100 |
| 6,216,109 B1 | 4/2001 | Zweben et al. | |
| 6,463,345 B1 * | 10/2002 | Peachey-Kountz et al. .... | 700/99 |
| 6,522,939 B1 * | 2/2003 | Strauch et al. ............. | 700/116 |
| 6,606,527 B2 * | 8/2003 | de Andrade et al. .......... | 700/97 |
| 6,611,727 B2 * | 8/2003 | Bickley et al. .............. | 700/99 |
| 6,662,062 B1 * | 12/2003 | Bjornson et al. ............. | 700/99 |
| 7,031,782 B2 * | 4/2006 | Kappelhoff et al. .......... | 700/95 |
| 7,242,994 B2 * | 7/2007 | Ishibashi et al. ............ | 700/100 |
| 7,305,275 B2 * | 12/2007 | Miyazaki et al. ............. | 700/99 |
| 2006/0282343 A1 * | 12/2006 | Palanisamy et al. .......... | 705/28 |

FOREIGN PATENT DOCUMENTS

EP 0 679 972 A1 11/1995

* cited by examiner

*Primary Examiner*—Charles R Kasenge
(74) *Attorney, Agent, or Firm*—Laurence A. Greenberg; Werner H. Stemer; Ralph E. Locher

(57) ABSTRACT

In a method of scheduling of processes at distributed and interacting manufacturing sites, a potential availability of predictive pairings of materials and work machines processing the materials over a predetermined period of time is determined for a plurality of manufacturing sites. The potential availability data of the predictive pairings is recorded. The method senses what materials and work machines are available in real-time, and records the real-time availability data of sensed materials and work machines. The real-time availability data is compared with the potential availability data of predictive pairings. In case of a discrepancy, the method determines for each manufacturing site local pairings of materials and work machines processing the materials, and processes the local pairings.

5 Claims, 2 Drawing Sheets

METHOD OF REAL-TIME SCHEDULING OF PROCESSES AT DISTRIBUTED MANUFACTURING SITES

BACKGROUND OF THE INVENTION

The present invention relates to a method for real-time scheduling of processes at distributed manufacturing sites.

Industrial automation has increased in scope and refinement with time. In general, industrial automation has focused on continuous processes comprising a plurality of distributed and interacting manufacturing sites. This covers in particular a broad range of manufacturing execution systems allowing an integrated workflow which are offered by the Siemens Corp. under its SIMATIC® product family. The virtue of this manufacturing design is that it provides adaptability to a varying product mix. The drawback is the resulting complexity of processes, management and quality control.

Automatic manufacturing proves to be a data-and-information-rich structure with an elevated number of parameters may be required to merely describe the manufacturing. Efficient scheduling is thus imperative.

Scheduling is the process that allocates resources for manufacturing. Often, the schedule is a result of simple local scheduling policies that are evaluated at run-time (e.g. shortest job first, longest job first, first in first out).

EP 0 679 972 A1 discloses a systematic scheduler for manufacturing lots of items by process resources. To determine which lot to schedule next for a process resource, an evaluation is made from a set of selected lots and a set of selected process resources. Scores are assigned to each pairing of a lot and process resource. The pair with the best score determines which lot will be processed on which process resource.

SUMMARY OF THE INVENTION

Local scheduling is deterministic, conservative, and short-sighted, a wider perspective occurs through predictive scheduling. Predictive scheduling considers the integrated workflow and remains robust and valid even under a wide variety of different types of disturbance. However, unexpected local influences may render the predictive scheduling locally obsolete and lead to inefficiencies. There is, therefore, is a need for a method of real-time scheduling of processes at distributed and interacting manufacturing sites which allows an efficient scheduler up-date.

Accordingly, one aspect involves a method of scheduling of processes at distributed and interacting manufacturing sites, wherein a potential availability of predictive pairings of materials and work machines processing the materials over a predetermined period of time is determined for a plurality of manufacturing sites. The potential availability data of the predictive pairings is recorded. The method senses what materials and work machines are available in real-time, and records the real-time availability data of sensed materials and work machines. The real-time availability data is compared with the potential availability data of predictive pairings. In case of a discrepancy, the method determines for each manufacturing site local pairings of materials and work machines processing the materials, and processes the local pairings.

It is an advantage that for a plurality of manufacturing sites and over a predetermined period of time predictive pairings of materials and work machines are determined and recorded, that local disruptions are sensed and that as a result for each manufacturing site local pairings of materials and work machines are determined, which local pairings replace the predictive pairings.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
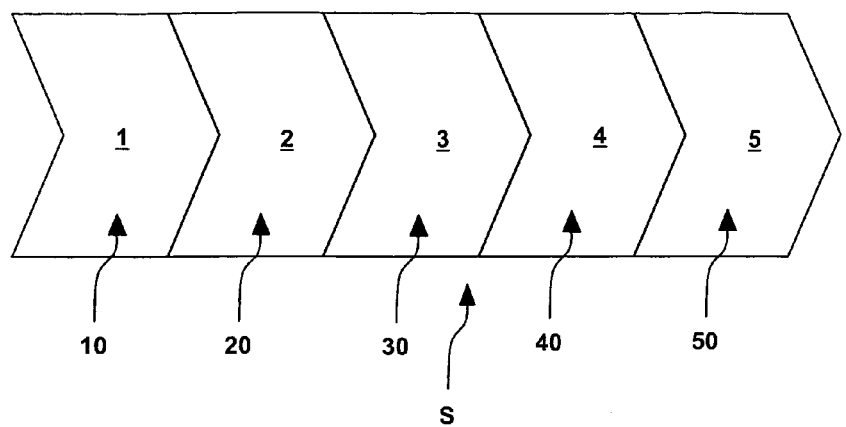
FIG. 1 is a schematic representation of the integrated workflow of the manufacturing execution system with a plurality of distributed and interacting manufacturing sites.

FIG. 1 shows different steps of an integrated workflow of a manufacturing execution system S. This schematic representation refers to five distinct workflow steps which are in serial succession, where development step 1 relates to the development of a product, sourcing step 2 to the sourcing of components for manufacturing the product, manufacturing step 3 to the manufacturing process of the product from the components, distribution step 4 to the distribution of the manufactured product and maintenance step 5 to the maintenance of the distributed product. Each manufacturing site 10, 20, 30, 40, 50 comprises at least one work machine, which work machine processes materials. The term "manufacturing" is understood in its widest meaning.

At each workflow step, the kind of manufacturing site 10, 20, 30, 40, 50, the kind of processed materials and the step result differ. At development step 1, the manufacturing site 10 may be a development center where test samples are processed and the step result may be a technical description of a product. At sourcing step 2, the manufacturing site 20 may be a component fabric which produces components for the product. At manufacturing step 3, the manufacturing of the product occurs at manufacturing site 30 by assembling previously delivered components. At distribution step 4 the manufacturing site 40 may be a retail shop where end consumers may buy the product. At maintenance step 5 the manufacturing site 50 may be a service center, where sold products are repaired. The man skilled in the art may modify this example representation in many ways. It is thus possible to change the number of workflow steps, it is also possible to add parallel workflow steps and to provide a manufacturing execution system S with a large number of manufacturing steps in serial and parallel succession.

Figure 3:
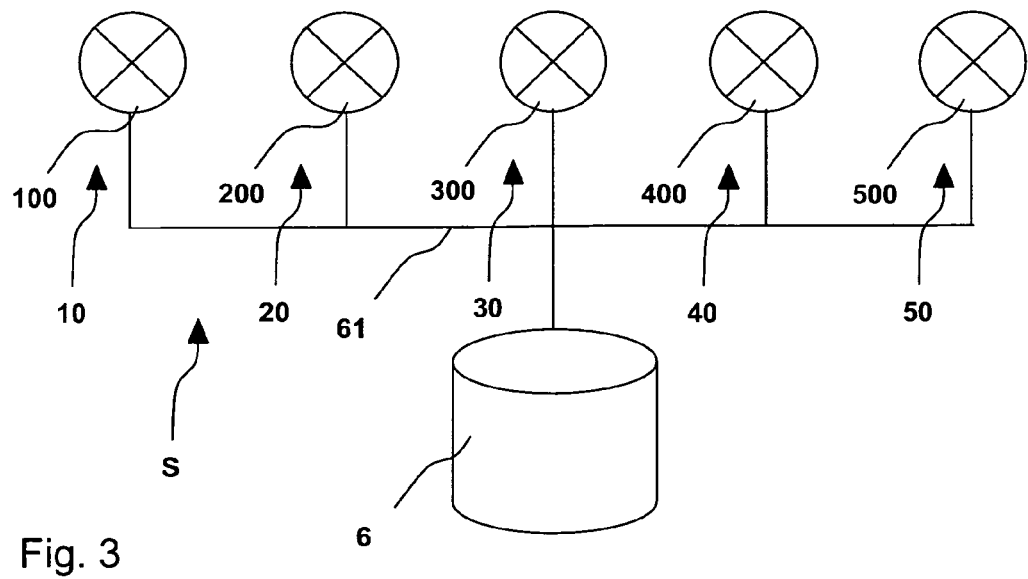
FIG. 3 is a schematic representation of the real-time sensing of available materials and work machines at local manufacturing sites according to FIG. 1.

As schematically shown by FIG. 3, the plurality of manufacturing sites 10, 20, 30, 40, 50 is locally or globally distributed. The manufacturing execution system S comprises at least one server 6 and a plurality of computers at each manufacturing site 10, 20, 30, 40, 50. Server 6 and each computer comprises at least one processor, at least one memory and a plurality of input/output devices for enabling a communication across a communication network 61. The server 6 and the computers are managed by at least one operating system. At least one computer program product is foreseen, which computer program product carries a computer program adapted to perform the invention. The computer program product may be stored in a computer readable medium carrying the computer program adapted to perform the invention. The communication network 61 may be a standard telecommunication network enabling communication by means of a standard network protocol like the Internet Protocol. Server 6 acts as master within the manufacturing execution system S in that server 6.

Figure 2:
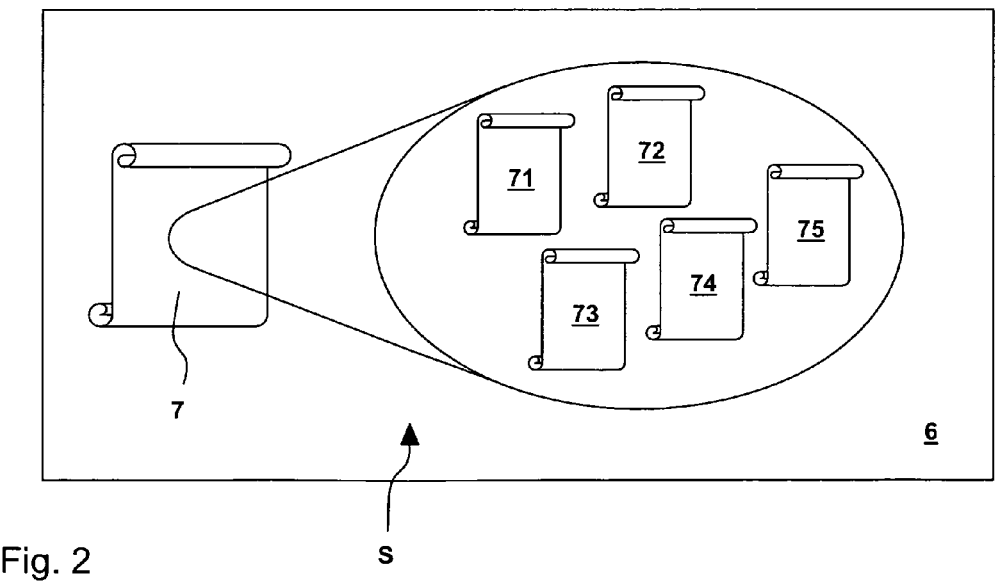
FIG. 2 is a schematic representation of predictive pairings of materials and work machines processing for the plurality of manufacturing sites according to FIG. 1.

Referring to FIG. 2, the manufacturing execution system S comprises a predictive pairing 7 hosted by server 6. The predictive pairing 7 describes the processes within the manufacturing execution system S and is a potential availability of materials and work machines processing the materials over a predetermined period of time in the future. The predictive pairing 7 represents thus the manufacturing capacity of the manufacturing execution system S. The predictive pairing 7 may be updated in time intervals. The predictive pairing 7 is recorded as potential availability data 71, 72, 73, 74, 75 in at least one computer file. The potential availability data 71, 72, 73, 74, 75 represent at workflow level a robust predictive schedule, which is likely to remain valid under a wide variety of different types of local disturbances. At each workflow step 1, 2, 3, 4, 5 each manufacturing site 10, 20, 30, 40, 50 possesses at least one potential availability data 71, 72, 73, 74, 75. The potential availability data 71, 72, 73, 74, 75 are transmitted to the manufacturing sites 10, 20, 30, 40, 50 by means of the communication network 61. The potential availability data 71, 72, 73, 74, 75 are stored in a memory and may be updated in time intervals.

In order to detect such local disturbances, the manufacturing execution system S comprises a plurality of manufacturing site sensors 160, 200, 300, 400, 500 as shown in FIG. 3. The manufacturing site sensors 100, 200, 300, 400, 500 sense at the manufacturing sites 10, 20, 30, 40, 50 the real-time availability of materials and work machines.

Figure 4:
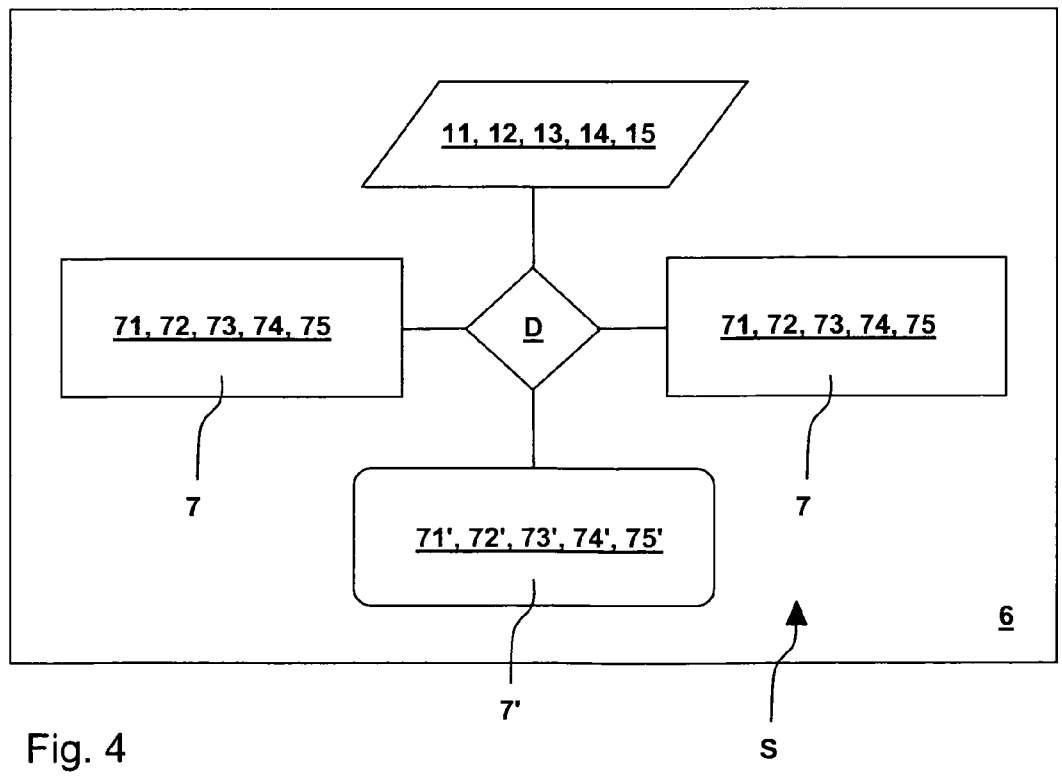
FIG. 4 is a schematic representation of the comparison of real-time availability data of sensed materials and work machines with potential availability data of predictive pairings for a manufacturing execution system according to FIG. 1.

Referring to FIG. 4, the real-time availability data 11, 12, 13, 14, 15 of materials and work machines at each manufacturing site 10, 20, 30, 40, 50 is recorded as real-time availability data 11, 12, 13, 14, 15 in at least one computer file. The real-time availability data 11, 12, 13, 14, 15 are stored in a memory and may be updated in time intervals.

It is thus possible to compare real-time availability data 11, 12, 13, 14, 15 of sensed materials and work machines with potential availability data 71, 72, 73, 74, 75 of predictive pairings 7. Such a comparison D occurs at each manufacturing site 10, 20, 30, 40, 50. In case of discrepancy, a local pairing 7' of materials and work machines processing the materials is determined. The local pairings 7' are recorded as real-time scheduler data 71', 72', 73', 74', 75' in at least one computer file. The real-time scheduler data 71', 72', 73', 74', 75' of the local parings 7' are processed at the manufacturing sites 10, 20, 30, 40, 50.

The following observations may lead to discrepancies: start of a process, end of a process, shortage of a product/material/component, delay of material delivery, delay of a process, change of a manufacturing due date, new important order, order is canceled, break down of a work machine, and bad quality of a product.

Such observations are recorded as observation data and stored in memories at each manufacturing site 10, 20, 30, 40, 50. During comparison D, such observation data are locally used as real-time availability data 11, 12, 13, 14, 15 of sensed materials and work machines. Comparison D occurs shortly before the time of manufacturing. Comparison D is fast because it takes place locally and requires very few additional data from other members of the manufacturing execution system S.

In a first example, the delay of material delivery is observed and recorded as observation data and used during comparison D as real-time availability data 11, 12, 13, 14, of sensed materials and work machines. Comparison D will alter a corresponding predictive pairing 7 by determining a local paring 7' according to which manufacturing of another product will be brought forward on these work machines by processing other available materials.

In a second example, the delay of a specific material delivery is observed with statistical relevance. This historical observation is recorded as observation data and used during comparison D as real-time availability data 11, 12, 13, 14, 15 of sensed materials and work machines. Comparison D alters a corresponding predictive pairing 7 by determining a local paring 7' according to which material order will be anticipated in order to compensate the observed delay of material delivery. Historical observations of real-time availability data 11, 12, 13, 14, 15 leads thus to local pairings 7'.

In a third example, a manufacturing site 10, 20, 30, 40, 50 observes a shortage of material. This observation is transmitted as observation data to the server 6 and/or to other potentially affected manufacturing sites 10, 20, 30, 40, 50. "Potentially affected" means that manufacturing sites 10, 20, 30, 40, 50 which are according to the integrated workflow placed in the vicinity of the observing manufacturing site 10, 20, 30, 40, 50 receive a transmittal of this observation. For each observation data at each manufacturing site 10, 20, 30, 40, 50 a list of potentially affected manufacturing sites 10, 20, 30, 40, 50 may be predefined and stored in a memory of the observing manufacturing site 10, 20, 30, 40, 50. Transmittal of an observation to other potentially affected manufacturing sites 10, 20, 30, 40, 50 may occur according to this list. This list may be updated in time intervals.

According to FIG. 1, manufacturing site 30 observes a shortage of material and transmits this observation as observation data to the antecedent sourcing site 20 and the subsequent retail shop 40. The transmitted observation results in local real-time availability data 12 and 14 of sensed materials and work machines at the sourcing site 20 and the retail shop 40. Comparison D alters a corresponding predictive pairing 7 by determining local parings 7' according to which manufacturing of components must be enforced at the sourcing site 20 and selling of the product will be stopped temporarily at the retail shop 40. Again only few observation data must be transmitted within the communication network 61 of the manufacturing execution system S.

Having illustrated and described a preferred embodiment for a novel method for real-time scheduling of processes at distributed manufacturing sites, it is noted that variations and modifications in the method can be made without departing from the spirit of the invention or the scope of the appended claims.

What is claimed is:

1. A method of scheduling of processes at distributed and interacting manufacturing sites, comprising:
   determining a potential availability of predictive pairings of materials and work machines processing said materials over a predetermined period of time for a plurality of manufacturing sites;
   recording the potential availability data of said predictive pairings;
   sensing what materials and work machines are available in real-time;
   recording real-time availability data of sensed materials and work machines;
   comparing the real-time availability data of sensed materials and work machines with the potential availability data of predictive pairings;
   in case of a discrepancy, determining for each manufacturing site local pairings of materials and work machines processing said materials,
   processing said local pairings;
   recording observations as observation data, and using said observation data locally as real-time availability data of the sensed materials and work machines;
   transmitting the observation data from an observing manufacturing site to at least one of a server and other manufacturing sites;
   transmitting the observation data to potentially affected manufacturing sites; and
   predefining for each observation data at each manufacturing site a list of potentially affected manufacturing sites, storing said list at the observing manufacturing site, and transmitting the observation data according to the list.

2. The method of claim 1, the observation data includes one of a start of a process, an end of a process, a shortage of a product/material/component, a delay of material delivery, a delay of a process, a change of a manufacturing due date, a new order, an order is cancelled, a break down of a work machine, and a bad quality of a product.

3. The method of claim 1, wherein an observation is made with statistical relevance and recorded as observation data.

4. A computer-readable storage medium having stored thereon an information processing program for scheduling processes at distributed and interacting manufacturing sites to be executed on a computer, the program comprising:
   determining a potential availability of predictive pairings of materials and work machines processing said materials over a predetermined period of time for a plurality of manufacturing sites;
   recording the potential availability data of said predictive pairings;
   sensing what materials and work machines are available in real-time;
   recording real-time availability data of sensed materials and work machines;
   comparing the real-time availability data of sensed materials and work machines with the potential availability data of predictive pairings;
   in case of a discrepancy, determining for each manufacturing site local pairings of materials and work machines processing said materials,
   processing said local pairings;
   recording observations as observation data, and using said observation data locally as real-time availability data of the sensed materials and work machines;
   transmitting the observation data from an observing manufacturing site to at least one of a server and other manufacturing sites;
   transmitting the observation data to potentially affected manufacturing sites; and
   predefining for each observation data at each manufacturing site a list of potentially affected manufacturing sites, storing said list at the observing manufacturing site, and transmitting the observation data according to the list.

5. A computer program product for scheduling processes at distributed and interacting manufacturing sites, the computer program product being embodied in a computer readable medium and comprising computer instructions for:
   determining a potential availability of predictive pairings of materials and work machines processing said materials over a predetermined period of time for a plurality of manufacturing sites;
   recording the potential availability data of said predictive pairings;
   sensing what materials and work machines are available in real-time;
   recording real-time availability data of sensed materials and work machines;
   comparing the real-time availability data of sensed materials and work machines with the potential availability data of predictive pairings;
   in case of a discrepancy, determining for each manufacturing site local pairings of materials and work machines processing said materials,
   processing said local pairings;
   recording observations as observation data, and using said observation data locally as real-time availability data of the sensed materials and work machines;
   transmitting the observation data from an observing manufacturing site to at least one of a server and other manufacturing sites;
   transmitting the observation data to potentially affected manufacturing sites; and
   predefining for each observation data at each manufacturing site a list of potentially affected manufacturing sites, storing said list at the observing manufacturing site, and transmitting the observation data according to the list.

* * * * *